(12) United States Patent
Galizia et al.

(10) Patent No.: US 12,270,744 B2
(45) Date of Patent: Apr. 8, 2025

(54) DEVICE FOR SELECTION OF ONE OR MORE MASSES FOR DETERMINING MATERIAL PROPERTIES OF A MATERIAL

(71) Applicant: Illinois Tool Works Inc., Glenview, IL (US)

(72) Inventors: Giuseppe Galizia, Turin (IT); Andrea Ricco, Turin (IT); Antonio Costa, Turin (IT)

(73) Assignee: Illinois Tool Works Inc., Glenview, IL (US)

( * ) Notice: Subject to any disclaimer, the term of this patent is extended or adjusted under 35 U.S.C. 154(b) by 96 days.

(21) Appl. No.: 18/151,886

(22) Filed: Jan. 9, 2023

(65) Prior Publication Data
US 2023/0221232 A1 Jul. 13, 2023

(30) Foreign Application Priority Data
Jan. 11, 2022 (EP) .................................... 22150835

(51) Int. Cl.
*G01N 11/02* (2006.01)
(52) U.S. Cl.
CPC .................................... *G01N 11/02* (2013.01)
(58) Field of Classification Search
CPC ........... G01N 11/02; G01N 2011/0006; G01N 11/04; G01N 29/04; G01N 11/00
USPC .... 73/1.08, 1.13, 54.04–54.06, 54.09, 54.13, 73/54.14, 54.36, 64.56, 83, 790, 813, 818, 73/821, 822, 826, 827, 834, 866
See application file for complete search history.

(56) References Cited

U.S. PATENT DOCUMENTS

| | | | | |
|---|---|---|---|---|
| 2,938,377 A * | 5/1960 | Sklar | ......................... | G01N 3/44 |
| | | | | 73/83 |
| 3,513,691 A * | 5/1970 | Aston | ....................... | G01N 3/54 |
| | | | | 73/83 |
| 2013/0327153 A1 * | 12/2013 | O'Rourke | ................ | G01N 3/02 |
| | | | | 73/826 |

FOREIGN PATENT DOCUMENTS

| | | |
|---|---|---|
| CN | 110339548 | 10/2019 |
| CN | 111413252 | 7/2020 |
| KR | 102197049 B1 * | 12/2020 |
| WO | 2017125787 | 7/2017 |
| WO | 2017178048 | 10/2017 |

OTHER PUBLICATIONS

European Office Communication with extended Search Report Appln No. 22150835.1 dated Jul. 15, 2022.

* cited by examiner

*Primary Examiner* — Robert R Raevis
(74) *Attorney, Agent, or Firm* — McAndrews, Held & Malloy, Ltd.

(57) ABSTRACT

An example device for selection of one or more masses among a plurality of masses arranged and removably fixed to a guide of a main frame of a test machine for determining material properties of a material during a test, the selected mass or masses allowing to push an effector for performing the test, the device comprising: a means for selecting at least one mass among said plurality of masses, comprising a means to determine which mass or masses are selected, said means to determine being configured to send a signal indicative of which mass or masses are selected to a computing unit for controlling a test process using the selected mass or masses.

14 Claims, 6 Drawing Sheets

DEVICE FOR SELECTION OF ONE OR MORE MASSES FOR DETERMINING MATERIAL PROPERTIES OF A MATERIAL

RELATED APPLICATIONS

This application claims priority to EP Application No. 22150835.1 having a filing date of Jan. 11, 2021, which is incorporated herein by reference in its entirety.

FIELD OF THE DISCLOSURE

The present disclosure relates to a measuring structure, and more particularly to a plastometer. More precisely, it concerns a device for selecting the right weight among a plurality of masses in order to perform a test on a thermoplastic material to get its mechanical properties of the melt mass-flow rate (MFR) and/or the melt volume-flow rate (MVR).

BACKGROUND

The Melt Flow Rate (MFR) test and Melt Volume Rate (MVR) test are simple methods of characterizing the flow properties of a plastic melted mass. These test methods are widely used, especially in quality assurance and incoming goods inspections. Demands on the extrusion plastometer vary according to which processing stage in the plastics industry is involved.

In detail, the melt mass-flow rate (MFR) and the melt volume-flow rate (MVR) are determined by extruding molten material from the cylinder of a plastometer through a die of specified length and diameter under pre-set conditions of temperature and load.

For measurement of MVR, the distance that the piston moves in a specified time, or the time required for the piston to move a specified distance is recorded and used to calculate the extrusion rate in cubic centimetres per 10 min.

MVR can be converted to MFR, or vice versa, if the melt density of the material at the test temperature is known.

Current melt flow measurement of thermoplastics, according to their specific application and known methods, it is often used by means of a manual mass application for the load conditions.

One machine to perform these tests is commonly modular and features a weight pegging device and automatic field-dependent parameterization. Such a machine is for example the "Mflow" machine from Zwick (see FIGS. 1 and 2). Such machine have the disadvantage that the mass selection step does not guarantee any unexpected disengagements for any reasons, including operator misuses or safety issues.

AIM AND ADVANTAGES OF THE DISCLOSURE

The present disclosure aims to alleviate the drawbacks of the state of the art solutions. Especially, the following aim and advantages of the present disclosure are:
  the mass selection shall guarantee any unexpected disengagements for any reasons, including operator misuses;
  the sensors for detecting the safe positions of the mass selector
  Safety/Data integrity check over the selected mass respect to the mass parameter within the specific customer method parametrization for the specific thermoplastic characterization;
  Mechanical safety retaining system that avoids removing the selection fork if the mass stack is not safely supported.

SUMMARY

The present disclosure concerns a device for selection of one or more masses among a plurality of masses arranged and removably fixed to a guide, preferably a retaining rod, of a main frame of a test machine for determining material properties of a material during a test, the selected mass or masses allowing to push an effector, preferably a piston, for performing the test, comprising a means for selecting at least one mass among said plurality of masses Advantageously, it comprises a means to determine which mass or masses are selected, said means to determine being configured to send a signal indicative of which mass or masses are selected to a computing unit for controlling a test process using the selected mass or masses.

Advantageously, said means to determine which mass or masses are selected is an ultrasonic sensor pointing said means for selecting at least one mass.

Advantageously, each mass comprises at least one hole extending through itself, said means for selecting at least one mass being adapted to be inserted in said at least one hole and to be removably connected to said guide when inserted in said at least one hole.

Moreover, said plurality of masses being stacked around the guide, preferably according to a well-known arrangement function of the weight and height of stacked masses. Advantageously, each mass comprises:
  a pair of holes extending through the corresponding mass; and
  preferably a main hole of a predetermined diameter in the centre of each mass Preferably, the manual selection of masses being performed by the means for selecting which comprises a main body onto which extends at least one pin, each pin comprising a first part of a first diameter and a second part of a second diameter, the second diameter being smaller than the first diameter, said means for selecting retaining all the selected masses.

Also, the guide passes through all the masses.

Moreover, the means for selecting comprises at least one magnet.

Advantageously, the means to determine which mass or masses are selected is a laser.

Advantageously, each mass comprises a TAG.

Advantageously, the device comprises a sensor positioning on the means for selecting to read said dedicated TAG in each mass.

Moreover, the device comprises a mechanical microswitch which allows to detect any out of position of the mass stack respect to a barrel axis of the test machine The present invention also concerns a plastometer comprising a device for manual selection of masses as described previously.

BRIEF DESCRIPTION OF THE DRAWINGS

Embodiments of the disclosure will now be described by way of example only with reference to the accompanying drawings in which.

DETAILED DESCRIPTION

For the avoidance of doubt, all of the features described here also apply to any aspect of the disclosure. Within the scope of the present application, it is expressly provided that the various aspects, embodiments, examples and alternatives set out in the preceding paragraphs, in the claims and/or in the following description and drawings, and in particular the individual characteristics thereof, can be taken independently or in any combination. In other words, all of the embodiments and/or features of any embodiment can be combined in any way, unless these features are incompatible. For the avoidance of doubt, the terms "may", "and/or", "for example", "for example" and any other similar term used in this document should be interpreted as non-limiting, so that any characteristic so described does not necessarily have to be present. Indeed, any combination of optional characteristics is expressly envisaged without departing from the scope of the invention, whether or not they are expressly claimed. The applicant reserves the right to modify any originally filed claim or to file any new claim accordingly, including the right to modify any originally filed claim to depend on and/or incorporate any feature of any other claim although not originally claimed in this manner.

Referring now to FIGS. 3a to 9, we will describe the present disclosure. The present disclosure concerns an extrusion plastometers which can be used to determine melt mass flow rates (MFR), but not exclusively. The present disclosure can also be used for any other engine which allows determination of a resistance parameter of a material by using a plurality of individual weights.

Figure 1:
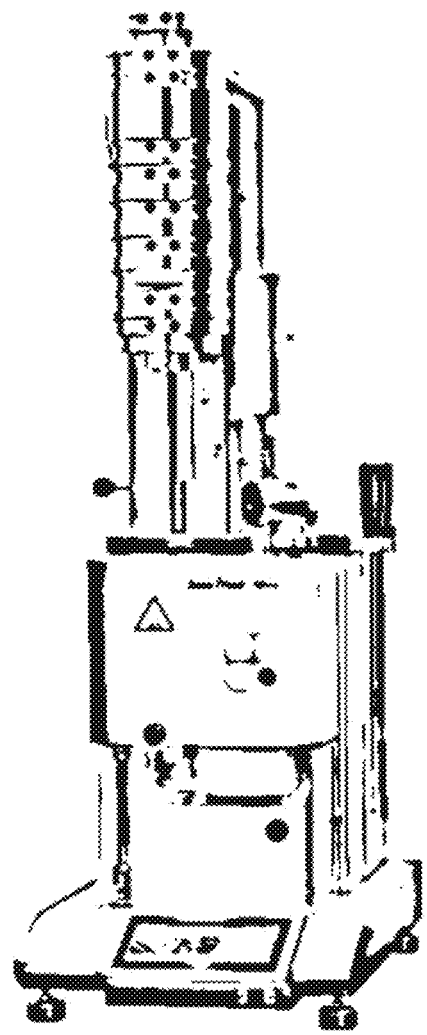
FIGS. 1 and 2 is a schematic view of the device according to a test machine of a state of the art.
Figure 2:
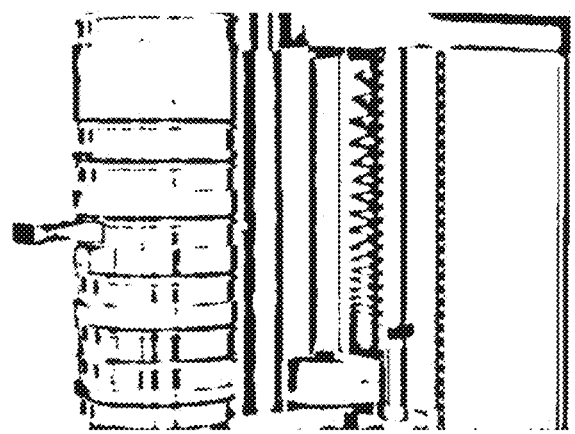

The idea leverages the same concept behind the Zwick's weight pegging device (see FIG. 2 introduced previously).

Before starting the description of the disclosure, here are below the requirements that the present disclosure must respect.

- the stacking order of the masses being known, the standard masses (in kg) shall be (0.325, 1.2, 2.16, 3.8, 5, 10, 12.5, 21.6) or (0.100, 0.325, 1.2, 2.16, 3.8, 5, 10, 21.6);
- allow any mass sequence customization without need for hardware redesigning;
- the operator need to select though a graphic user interface the test mass with the automatic mass selector;
- the mass selection shall guarantee any unexpected disengagements for any reasons, including operator misuse;
- improve the reliability of the sensors for detecting the safe positions of the mass selector (e.g. reduce the probability of cable failure);

FIGS. 3a to 9 are now discussed in relation to a preferred embodiment.

Figure 3A:
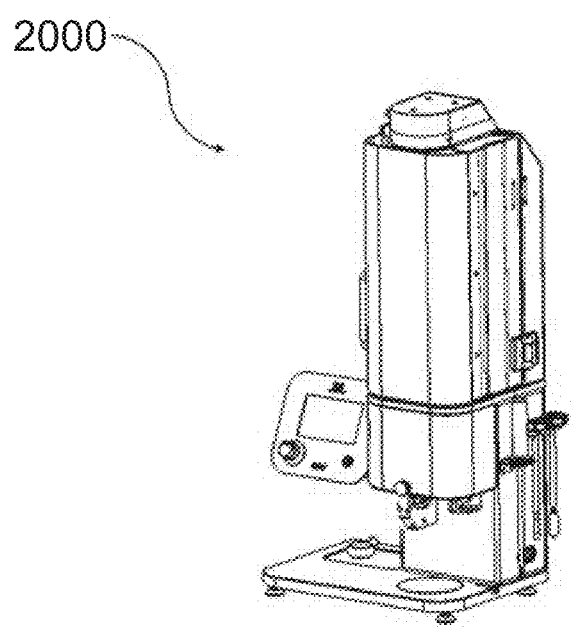
FIG. 3a to 9 describes different view and details of the present disclosure.
Figure 3B:
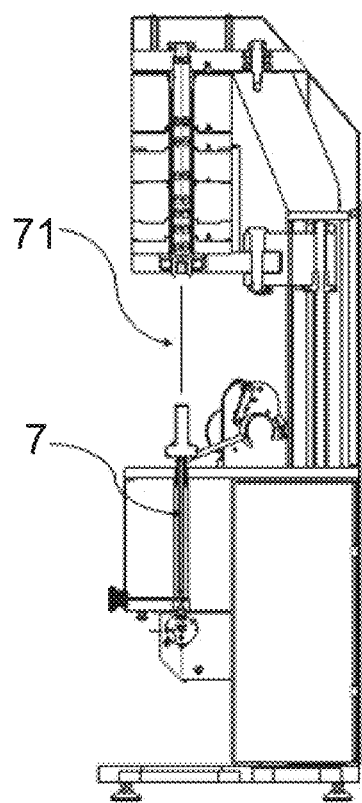
Figure 3C:
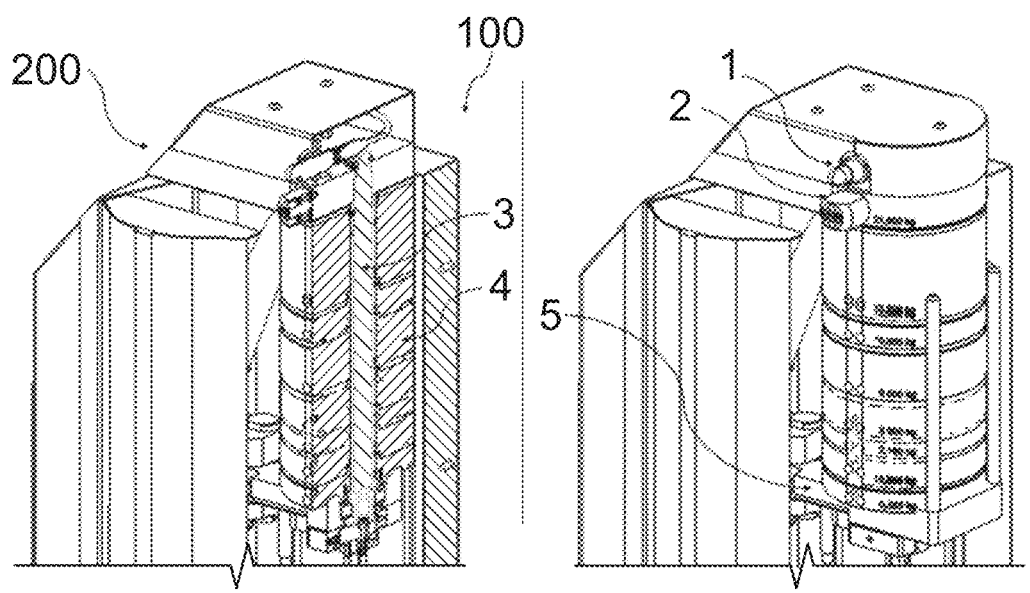
Figure 4:
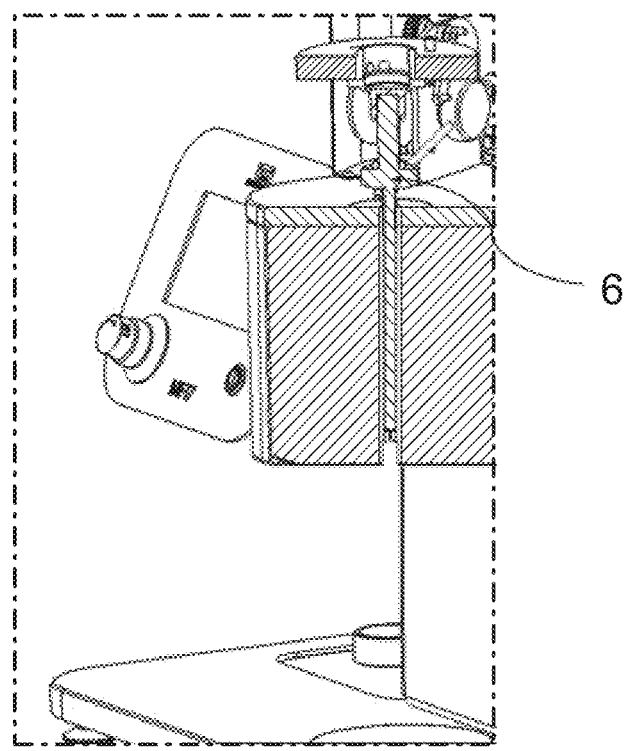
Figure 5:
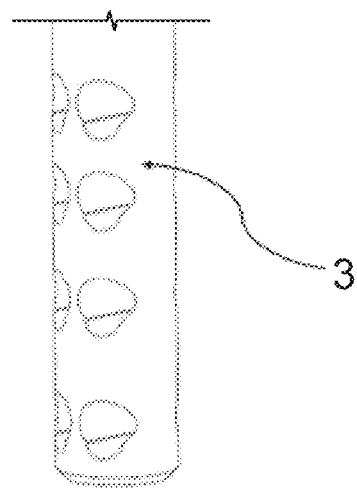
Figure 6:
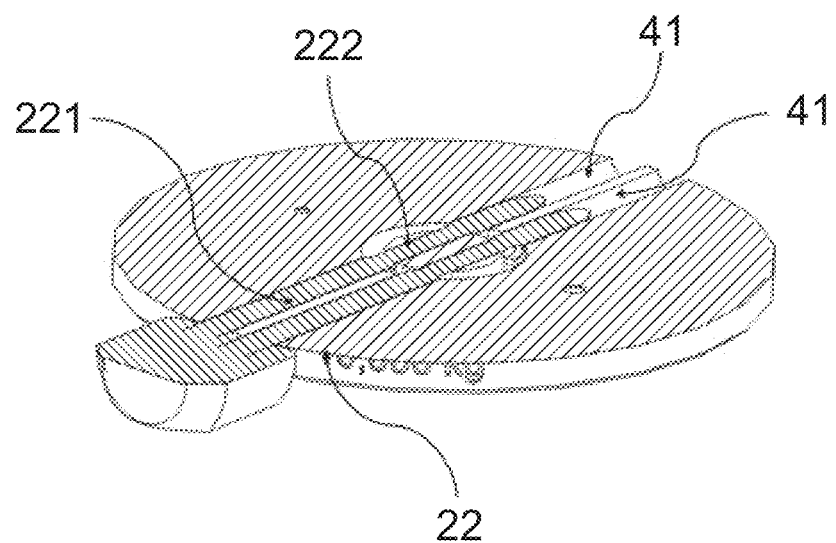
Figure 7:
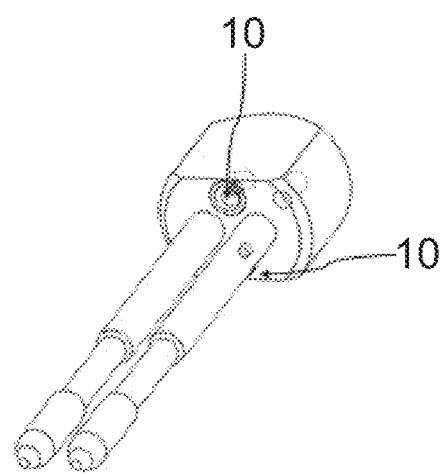
Figure 8:
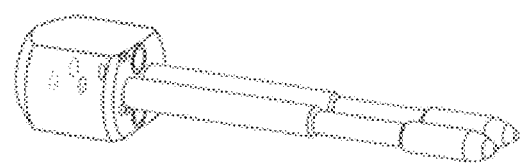
Figure 9:
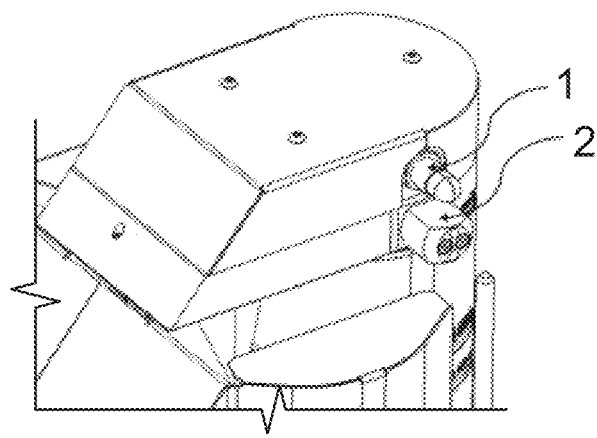

FIGS. 3a and 3b illustrate a view of a test machine (2000) for determining material properties of a material during a test, for example a plastometer, which implements a device (100) for selection of one or more masses (4) among a plurality of masses arranged, according to the present disclosure.

In such a test machine, the masses are removably fixed to a guide (3), preferably a retaining rod, the guide (3) being a part of a main frame (200) of the test machine.

The selected mass or masses allows to push an effector (6), preferably a piston, for performing the test.

The device (100) comprises a means for selecting (2) at least one mass among said plurality of masses (4). It also comprises a means to determine (1) which mass or masses are selected, said means to determine (1) being configured to send a signal indicative of which mass or masses are selected to a computing unit for controlling a test process using the selected mass or masses.

Preferably, masses are arranged around the guide (3), said guide passing through the axis of each mass and the axis of said holding plate. In this way, the device is more stable.

In a preferred embodiment, said means to determine (1) which mass or masses are selected is an ultrasonic sensor pointing said means for selecting (2) at least one mass.

Once the signal emitted by the ultrasonic sensor reach the means for selecting (2), this signal is reflected to the ultrasonic sensor and gives the information of which masses are selected.

Indeed, the plurality of masses are stacked around the guide (3), preferably according to a well-known arrangement function of a weight of each mass, on a holding element (5), preferably a plate, supporting said stacked masses. The selected mass or masses allows to push the effector, preferably a piston, for performing the test. In this way the holding element (5) will apply only selected test mass over the piston before starting the test and measuring.

As discussed, the means to determine (1) which mass or masses are selected is an ultrasonic sensor placed above the means for selecting (2) in such a way as it is able to detect the selected mass and, so to avoid any mass selection mistakes before starting a test As matter of fact, the sensor can measure the distance of the means for selecting (2) and, so, to detect the specific mass selection. The ultrasonic sensor is a contactless solution for detecting that the means for selecting (2) in the selecting position so there is no risk of cable damage.

The ultrasonic sensor thus guarantees that the selected mass is the same respect with the one chosen in a test method. This feature is one of the safety features of the present invention.

To summarize, the means to determine the position of means for manually selecting (2) according to said well-known arrangement" has been implemented as follows: the ultrasonic sensor is located on the top (above the highest position for the mean for manually selecting the masses). This emits an acoustic wave. The wave is reflected once it hits the mean for manually selecting the masses. So, considering that the sound velocity is a constant and measuring the time from the wave emission to his return the sensor is able to measure a distance. Then, a firmware knows that for a specific distance, plus or minus an acceptance threshold, there is a specific mass. In this way we are able to correlate a position measurement to a specific mass.

This is just one possible design for implementing the masse recognition. As matter of fact, alternatives to the ultrasonic sensor or confirmation of which amount of masses are selected is possible as explained in more details later on the description.

Said means to determine the position of the selected masses is an ultrasonic sensor but it can also be other position measurement sensors such as laser or ID readers such as RFID tags or artificial vision devices such as cameras.

In one embodiment, each mass (4) comprises at least one hole (41) extending through itself, said means for selecting (2) at least one mass being adapted to be inserted in said at least one hole and to be removably connected to said guide when inserted in said at least one hole (41).

Said plurality of masses are stacked around the guide, preferably according to a well-known arrangement function of the weight and height of stacked masses.

Each mass (4) can comprise, in one preferred embodiment:
- a pair of holes (41) extending through the corresponding mass; and
- preferably a main hole of a predetermined diameter in the center of each mass (4).

Each pair of holes being arranged at the top of a mass and passing through the main hole of the corresponding mass.

Each hole of a pair of holes can be parallel together, or not.

The distance between the holes can be inferior to the guide (or rode)) diameter. In this way, a "T-connection" is done once the means for selection (2) goes through holes of the guide (3).

Of course, other arrangements of holes can be done.

One can also imagine also an embodiment with more than two holes extending through the corresponding mass Preferably, the manual selection of masses is performed by the means for selecting (2) which comprises a main body (21) onto which extends at least one pin (22), each pin comprising a first part (221) of a first diameter and a second part (222) of a second diameter, the second diameter being smaller than the first diameter, said means for selecting (2) at least one mass retaining all the selected masses Pins are removable, or not, and their length are approximatively the same as the mass diameter. One can imagine other length with a pin length superior or inferior to the mass diameter Optionally, each hole (41) passes through an entire thickness of the guide (3)

Said means for selecting (2) masses retaining all the masses (4) from the selected one to the top one of the mass stack as the holding element (5) moves downside;

In a variant, the guide (3) passes through all the masses (4) and the holding element (5)

The means for selecting (2) also comprises at least one magnet (10). In a preferred embodiment, two Cylindric Magnets act against any accidental causes that can bring the means for selecting out of position thanks to their nominal adhesive force of 25 N per each, for example. Thus, these magnets allows allow to minimize the risk of having the means for selection being out-of-position. Basically masses are made of magnetic steel. There are few masses made of aluminium. In this case there is a magnetic steel insert in the position corresponding to the cylindric magnets.

In a variant, the means to determine (1) which mass or masses are selected is a laser.

In one another variant, each mass comprises a TAG. In this case, the device (100) comprises a sensor positioning on the means for selecting (2) to read said dedicated TAG in each mass. Sensor positioning could be a RFID reader placed in the means for selecting (2) able to read a dedicated TAG in each mass. This is just a possible alternative solution that the present invention figure out. This can be seen as an alternative solution for the selection of masses and also it can be a combination with the means for selecting (2) masses and means to determine (1) in a way to confirm the selected masses.

The device also comprises a mechanical microswitch (not shown) which allows to detect any out of position of the mass stack respect to a barrel axis (7) of the test machine. The out of position can be detected if there is an offset between the barrel axis (7) and an axis of the guide (3) which is also an axis (71) of the stacked masses.

The present design of masses has been sized in such a way as to compensate for the bending induced by the load transfer of the mass stack from the holding plate to the guide and vice versa.

The ultrasonic sensor is a contactless solution for detecting that the means for selecting is in the selecting position so there is no risk of cable damage.

In a preferred embodiment, a mechanical microswitch (not shown) allows to detect any out of position of the mass stack respect to barrel axis (7). Where out of position means the condition in which the mass stack axis (71, FIG. 3b) is not properly aligned with the barrel axis.

In one another characteristics, said plurality of masses are stacked around the guide, preferably according to a well-known arrangement function of a weight of each mass, on a holding element (5), preferably a plate, supporting said stacked masses. The selected mass or masses allowing to push an effector (6), preferably a piston (6), for performing the test, comprising a means for manually selecting (2) at least one mass among said plurality of masses. The means for selecting (2) holds all the masses (4) from the selected one to the top one of the mass stack as the holding plate (5) moves downside. In this way, once the holding plate (5) will move down, it will apply only selected test mass over the piston before starting the test and measuring To summarize, the device of the present invention is designed in order to allow a quick and effortless manual selection of the test mass through a means for selecting (2).

Holes in the guide (3) combined with the double diameters in the two pins of the means for selecting (like a "selection fork") acts as safety device. As matter of fact, once the holding plate moves down for starting a test, the smaller diameters of the selection fork engage the smaller diameters of the holes. This prevents the operator from removing the "selection fork" once the test has been started. Thus, it prevents the risk of someone collapsing the mass stack when the plate is not at the top position.

Also, two magnetics in the means of selecting (2) allow to minimize the risk of having the fork out-of-position.

Lastly, an ultrasonic sensor (1) has been placed above the handle of means for selecting (2) in such a way as it is able to detect the selected mass and, so to avoid any mass selection mistakes before starting a test. As matter of fact, the sensor can measure the distance of means for selecting (2) and, so, to detect the specific mass selection.

These characteristics deserve a strong value proposition in terms of SAVING_TIME and SAVING_COST (no tests to be repeated due to mistakes).

The present disclosure can be implemented in a plastometer but not exclusively.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A device for selection of one or more masses among a plurality of masses arranged in a stacked configuration and removably fixed to a guide of a main frame of a test machine for determining material properties of a material during a test, the selected ones of the plurality of masses configured to push down on an effector for performing the test, and the non-selected ones of the plurality of masses prevented from pushing down on the effector, the device comprising:
  a means for selecting configured to enable selection of at least one mass among said plurality of masses;
  a means to determine which mass or masses are selected, said means to determine being configured to send a signal indicative of which mass or masses are selected to a computing unit for controlling a test process using the selected mass or masses; and
  a holding element positioned at the bottom of the plurality of masses arranged in a stacked configuration, and above the effector;
  wherein the holding element supports the selected mass or masses pushing down on the effector.

2. The device according to claim 1, wherein said means to determine which mass or masses are selected is an ultrasonic sensor pointing at said means for selecting at least one mass to reflect a signal off of the means for selecting.

3. The device according to claim 1, wherein each mass comprises at least one hole extending through the mass, said means for selecting at least one mass being adapted to be inserted in said at least one hole and to be removably connected to said guide when inserted in said at least one hole.

4. The device according to claim 1, wherein said plurality of masses are stacked around the guide, according to an arrangement function of the weight and height of stacked masses.

5. The device according to claim 1, wherein each mass comprises a pair of holes extending through the corresponding mass.

6. The device according to claim 5, wherein each mass further comprises a main hole of a predetermined diameter in the center of each mass.

7. The device according to claim 1, wherein the means for selecting is configured to enable the selection of masses manually by the operator, the means for selecting comprising a main body onto which extends at least one pin, each pin comprising a first part having a first diameter and a second part having a second diameter, the second diameter being smaller than the first diameter, wherein the length of each pin is greater than the mass diameter, said means for selecting at least one mass retaining all the selected masses.

8. The device according to claim 1, wherein the means for selecting comprises at least one magnet for keeping the means for selecting in position relative to the mass.

9. The device according to claim 1, wherein the means to determine which mass or masses are selected by the operator is a laser.

10. The device according to claim 1, further comprising a mechanical microswitch configured to detect any mass of the mass stack that is out of position with respect to a barrel axis of the test machine.

11. The device according to claim 1, wherein the guide comprises a retaining rod.

12. The device according to claim 1, wherein the effector comprises a piston.

13. A plastometer, comprising the device for selection of masses according to claim 1.

14. The device according to claim 1, wherein the means for selecting is configured to enable manual selection of the at least one mass among said plurality of masses.

* * * * *